(12) United States Patent
Hurst, Jr. et al.

(10) Patent No.: US 7,254,175 B2
(45) Date of Patent: Aug. 7, 2007

(54) FRAME-ACCURATE SEAMLESS SPLICING OF INFORMATION STREAMS

(75) Inventors: Robert Norman Hurst, Jr., Hopewell, NJ (US); Christopher Ward, Glen Ridge, NJ (US); Clifford Pecota, New Egypt, NJ (US); Xiaobing Lee, Nashua, NH (US); Gary Hughes, Chelmsford, MA (US)

(73) Assignee: CrystalMedia Technology, Inc., Sunnyvale, CA (US)

( * ) Notice: Subject to any disclaimer, the term of this patent is extended or adjusted under 35 U.S.C. 154(b) by 287 days.

(21) Appl. No.: 11/141,955

(22) Filed: Jun. 1, 2005

(65) Prior Publication Data

US 2005/0281328 A1   Dec. 22, 2005

Related U.S. Application Data

(63) Continuation of application No. 09/430,644, filed on Oct. 29, 1999, now abandoned, which is a continuation-in-part of application No. 09/347,213, filed on Jul. 2, 1999, now Pat. No. 6,912,251.

(51) Int. Cl.
*H04B 1/66* (2006.01)

(52) U.S. Cl. ............. 375/240.01; 375/240.25; 375/240.24; 375/240.26; 375/240.15; 382/233; 382/235; 382/238; 382/236

(58) Field of Classification Search ........... 375/240.01, 375/240.25, 240.24, 240.26, 240.15; 382/233, 382/235, 238, 236
See application file for complete search history.

(56) References Cited

U.S. PATENT DOCUMENTS

| | | |
|---|---|---|
| 5,864,682 A | 1/1999 | Porter et al. |
| 5,917,830 A | 6/1999 | Chen et al. |
| 5,982,436 A | 11/1999 | Balakrishnan et al. |
| 6,038,000 A | 3/2000 | Hurst |
| 6,104,441 A * | 8/2000 | Wee et al. ............. 375/240.15 |
| 6,137,834 A | 10/2000 | Wine et al. |
| 6,141,358 A * | 10/2000 | Hurst et al. ................. 370/543 |

FOREIGN PATENT DOCUMENTS

WO   WO99/05864   4/1999

OTHER PUBLICATIONS

Hedtke R. et al., "Schnittbearbeitung Von MPEG-2-Codierten Videosequenzen." 50(7):367-373 (1996).
Wee et al., "Splicing MPEG Video Streams in the Compressed Domain." *Proceedings of Signal Processing Society Workshop on Multimedia Signal Processing* XP002081482 (1997).
Hedtke et al, "Editing of MPEG-2 Encoded Video Sequences." *Fernseh-Und Kino-Technik* 50(7):367-373 (1996).

* cited by examiner

*Primary Examiner*—Shawn S. An
(74) *Attorney, Agent, or Firm*—Andrew D. Fortney

(57) ABSTRACT

A method and apparatus for generating universal splice point adapters, where during a splicing operation an "out-point splicing adapter" is used to transition from an exit stream, while an "in-point splicing adapter" is used to transition to an entry stream.

24 Claims, 9 Drawing Sheets

| | | | (SMPTE TIME CODES) | | |
|---|---|---|---|---|---|
| STREAM A | 00:00:00:00 | <$t_2$ | 00:00:02:13 | N/A | N/A |
| STREAM B | N/A | N/A | 00:00:00:23 | >$t_2$ | 00:00:04:17 |
| RESULTANT | 00:00:00:00 | <$t_2$ | 00:00:02:13 | >$t_2$ | 00:00:04:17 |
| | $t_0$ | $t_1$ | $t_2$ | $t_3$ | $t_4$ |

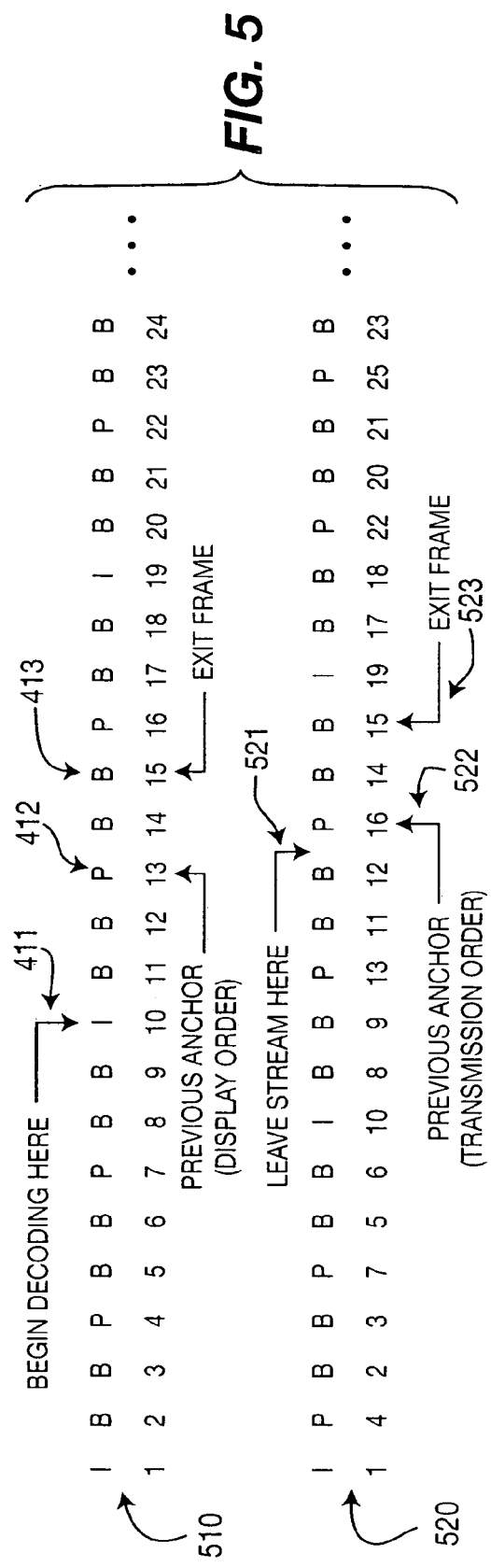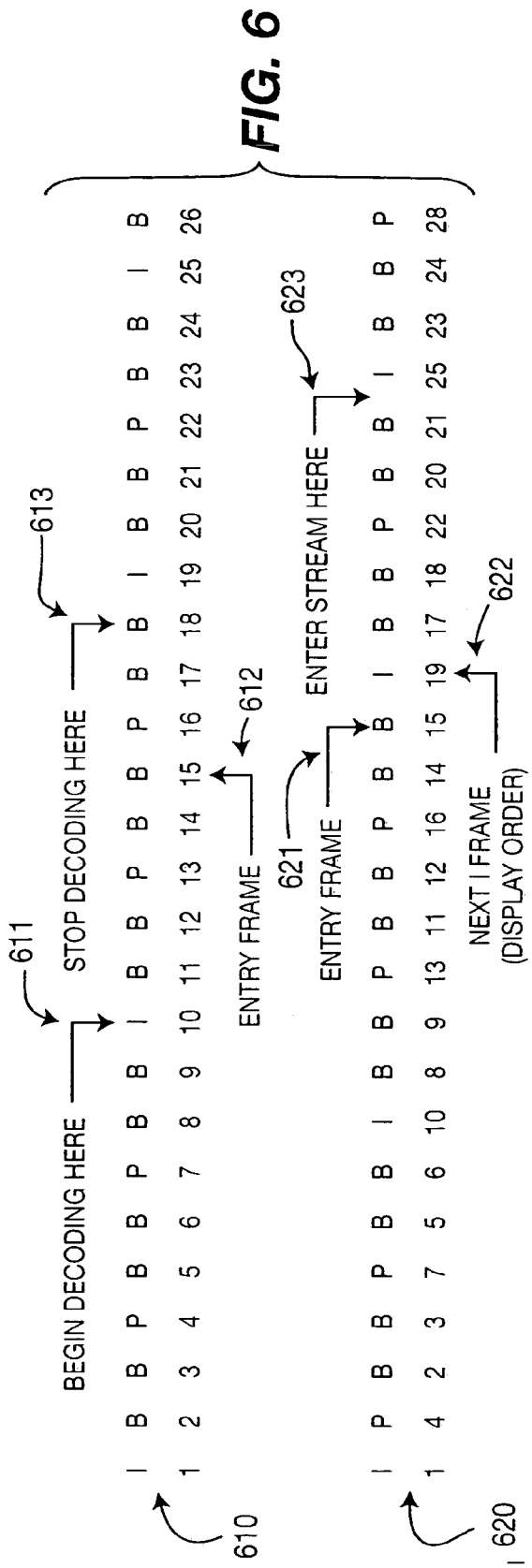

| | | | | | | | | | | | | |
|---|---|---|---|---|---|---|---|---|---|---|---|---|
| 1 | s: | 29 | e: | 878 | fr: | 0I | PT: | 25500 | DT: | 22500 | Bd: 250ms | cBd: 0ms | I O |
| 2 | s: | 879 | e: | 1213 | fr: | 3P | PT: | 34500 | DT: | 25500 | Bd: 217ms | cBd: 217ms | |
| 3 | s: | 1214 | e: | 1444 | fr: | 1B | PT: | 28500 | DT: | 0 | Bd: 225ms | cBd: 225ms | |
| 4 | s: | 1445 | e: | 1770 | fr: | 2B | PT: | 31500 | DT: | 0 | Bd: 240ms | cBd: 240ms | O |
| 5 | s: | 1771 | e: | 2355 | fr: | 6P | PT: | 43500 | DT: | 34500 | Bd: 248ms | cBd: 248ms | |
| 6 | s: | 2356 | e: | 2871 | fr: | 4B | PT: | 37500 | DT: | 0 | Bd: 236ms | cBd: 236ms | |
| 7 | s: | 2872 | e: | 3298 | fr: | 5B | PT: | 40500 | DT: | 0 | Bd: 229ms | cBd: 229ms | O |
| 8 | s: | 3299 | e: | 3840 | fr: | 9P | PT: | 52500 | DT: | 43500 | Bd: 230ms | cBd: 230ms | |
| 9 | s: | 3841 | e: | 4225 | fr: | 7B | PT: | 46500 | DT: | 0 | Bd: 221ms | cBd: 221ms | |
| 10 | s: | 4226 | e: | 4602 | fr: | 8B | PT: | 49500 | DT: | 0 | Bd: 224ms | cBd: 224ms | O |
| 11 | s: | 4603 | e: | 4942 | fr: | 12P | PT: | 61500 | DT: | 52500 | Bd: 228ms | cBd: 228ms | |
| 12 | s: | 4943 | e: | 5310 | fr: | 10B | PT: | 55500 | DT: | 0 | Bd: 235ms | cBd: 235ms | |
| 13 | s: | 5311 | e: | 5678 | fr: | 11B | PT: | 58500 | DT: | 0 | Bd: 240ms | cBd: 240ms | O |
| 14 | s: | 5679 | e: | 6497 | fr: | 13I | PT: | 64500 | DT: | 61500 | Bd: 245ms | cBd: 245ms | I O |
| 15 | s: | 6498 | e: | 6685 | fr: | 16P | PT: | 73500 | DT: | 64500 | Bd: 215ms | cBd: 215ms | |
| 16 | s: | 6686 | e: | 7014 | fr: | 14B | PT: | 67500 | DT: | 0 | Bd: 234ms | cBd: 234ms | |
| 17 | s: | 7015 | e: | 7365 | fr: | 15B | PT: | 70500 | DT: | 0 | Bd: 241ms | cBd: 241ms | O |
| 18 | s: | 7366 | e: | 7594 | fr: | 19P | PT: | 82500 | DT: | 73500 | Bd: 248ms | cBd: 248ms | |
| 19 | s: | 7595 | e: | 8045 | fr: | 17B | PT: | 76500 | DT: | 0 | Bd: 263ms | cBd: 263ms | |
| 20 | s: | 8046 | e: | 8540 | fr: | 18B | PT: | 79500 | DT: | 0 | Bd: 261ms | cBd: 261ms | O |
| 21 | s: | 8541 | e: | 8839 | fr: | 22P | PT: | 91500 | DT: | 82500 | Bd: 256ms | cBd: 256ms | |
| 22 | s: | 8840 | e: | 9347 | fr: | 20B | PT: | 85500 | DT: | 0 | Bd: 267ms | cBd: 267ms | |
| 23 | s: | 9348 | e: | 9841 | fr: | 21B | PT: | 88500 | DT: | 0 | Bd: 260ms | cBd: 260ms | O |
| 24 | s: | 9842 | e: | 10213 | fr: | 25P | PT: | 100500 | DT: | 91500 | Bd: 256ms | cBd: 256ms | |
| 25 | s: | 10214 | e: | 10704 | fr: | 23B | PT: | 94500 | DT: | 0 | Bd: 260ms | cBd: 260ms | |
| 26 | s: | 10705 | e: | 11196 | fr: | 24B | PT: | 97500 | DT: | 0 | Bd: 255ms | cBd: 255ms | O |
| 27 | s: | 11197 | e: | 12165 | fr: | 26I | PT: | 103500 | DT: | 100500 | Bd: 250ms | cBd: 250ms | I O |
| 28 | s: | 12166 | e: | 12536 | fr: | 29P | PT: | 112500 | DT: | 103500 | Bd: 208ms | cBd: 208ms | |
| 29 | s: | 12537 | e: | 12994 | fr: | 27B | PT: | 106500 | DT: | 0 | Bd: 213ms | cBd: 213ms | |
| 30 | s: | 12995 | e: | 13408 | fr: | 28B | PT: | 109500 | DT: | 0 | Bd: 211ms | cBd: 211ms | O |
| 31 | s: | 13409 | e: | 13750 | fr: | 32P | PT: | 121500 | DT: | 112500 | Bd: 212ms | cBd: 212ms | |
| 32 | s: | 13751 | e: | 14158 | fr: | 30B | PT: | 115500 | DT: | 0 | Bd: 219ms | cBd: 219ms | |
| 33 | s: | 14159 | e: | 14563 | fr: | 31B | PT: | 118500 | DT: | 0 | Bd: 221ms | cBd: 221ms | O |
| 34 | s: | 14564 | e: | 14886 | fr: | 35P | PT: | 130500 | DT: | 121500 | Bd: 222ms | cBd: 222ms | |
| 35 | s: | 14887 | e: | 15290 | fr: | 33B | PT: | 124500 | DT: | 0 | Bd: 231ms | cBd: 231ms | |
| 36 | s: | 15291 | e: | 15696 | fr: | 34B | PT: | 127500 | DT: | 0 | Bd: 233ms | cBd: 233ms | O |
| 37 | s: | 15697 | e: | 15999 | fr: | 38P | PT: | 139500 | DT: | 130500 | Bd: 234ms | cBd: 234ms | |
| 38 | s: | 16000 | e: | 16403 | fr: | 36B | PT: | 133500 | DT: | 0 | Bd: 244ms | cBd: 244ms | |
| 39 | s: | 16404 | e: | 16802 | fr: | 37B | PT: | 136500 | DT: | 0 | Bd: 246ms | cBd: 246ms | O |
| 40 | s: | 16803 | e: | 17627 | fr: | 39I | PT: | 142500 | DT: | 139500 | Bd: 249ms | cBd: 249ms | I O |
| 41 | s: | 17628 | e: | 17916 | fr: | 42P | PT: | 151500 | DT: | 142500 | Bd: 218ms | cBd: 218ms | |
| 42 | s: | 17917 | e: | 18326 | fr: | 40B | PT: | 145500 | DT: | 0 | Bd: 229ms | cBd: 229ms | |
| 43 | s: | 18327 | e: | 18743 | fr: | 41B | PT: | 148500 | DT: | 0 | Bd: 230ms | cBd: 230ms | O |
| 44 | s: | 18744 | e: | 19066 | fr: | 45P | PT: | 160500 | DT: | 151500 | Bd: 231ms | cBd: 231ms | |
| 45 | s: | 19067 | e: | 19492 | fr: | 43B | PT: | 154500 | DT: | 0 | Bd: 240ms | cBd: 240ms | |
| 46 | s: | 19493 | e: | 19925 | fr: | 44B | PT: | 157500 | DT: | 0 | Bd: 240ms | cBd: 240ms | O |
| 47 | s: | 19926 | e: | 20246 | fr: | 48P | PT: | 169500 | DT: | 160500 | Bd: 240ms | cBd: 240ms | |
| 48 | s: | 20247 | e: | 20683 | fr: | 46B | PT: | 163500 | DT: | 0 | Bd: 248ms | cBd: 248ms | |
| 49 | s: | 20684 | e: | 21122 | fr: | 47B | PT: | 166500 | DT: | 0 | Bd: 248ms | cBd: 248ms | O |
| 50 | s: | 21123 | e: | 21454 | fr: | 51P | PT: | 178500 | DT: | 169500 | Bd: 247ms | cBd: 247ms | |
| 51 | s: | 21455 | e: | 21895 | fr: | 49B | PT: | 172500 | DT: | 0 | Bd: 255ms | cBd: 255ms | |
| 52 | s: | 21896 | e: | 22373 | fr: | 50B | PT: | 175500 | DT: | 0 | Bd: 254ms | cBd: 254ms | MO |
| 53 | s: | 22375 | e: | 23078 | fr: | 52I | PT: | 181500 | DT: | 178500 | Bd: 250ms | cBd: 250ms | I O |
| 54 | s: | 23079 | e: | 23416 | fr: | 55P | PT: | 190500 | DT: | 181500 | Bd: 229ms | cBd: 229ms | |

*FIG. 11*

FRAME-ACCURATE SEAMLESS SPLICING OF INFORMATION STREAMS

CROSS REFERENCE TO RELATED APPLICATIONS

This application is a continuation of U.S. patent application Ser. No. 09/430,644, filed Oct. 29, 1999, now abandoned which is a continuation-in-part if U.S. patent Ser. No. 09/347,213, filed Jul. 2, 1999 (now U.S. Pat. No. 6,912,251) both incorporated herein by reference in their entirety.

The invention relates to communications systems generally and, more particularly, the invention relates to a method for splicing or concatenating information streams in a substantially seamless manner.

GOVERNMENT RIGHTS IN THIS INVENTION

This invention was made with U.S. government support under contract number 70NANB5H1174. The U.S. government has certain rights in this invention.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

It is important to television studios and other "consumers" of information streams to be able to concatenate or splice between information streams (e.g., transport encoded program streams incorporating video, audio and other associated information sub-streams) in a substantially seamless and frame accurate manner. "Frame accurate" means that a splice occurs precisely at the frames selected by the user, regardless of the frame type of the encoded frame (e.g., I-, P- or B-frame encoding). "Seamless splice" means a splice which results in a continuous, valid MPEG stream. Thus, a frame accurate seamless splicer will preserve an exact number of frames when performing a frame accurate seamless splice of a first information stream into a second information stream (e.g., a transport encoded program comprising a 900 video frame commercial presentation may be scheduled into a "slot" of exactly 900 frames).

Several known methods utilize variations of the following procedure: decoding an "in stream" and an "out stream" to a baseband or elementary level, performing a splice operation and re-encoding the resulting spliced stream. These methods provide frame accurate seamless splices, but at great expense.

In an improved method allowing seamless splicing at the transport stream level, MPEG and MPEG-like information streams including, e.g., video information may be spliced together in a relatively seamless manner by defining "in-points" and "out-points" for each stream that are indicative of, respectively, appropriate stream entry and exit points. For example, a packet containing a video sequence header in an MPEG-like video stream comprises an appropriate in-point. An MPEG-like information stream that contains such in-points and out-points is said to be spliceable. The Society of Motion Picture and Television Engineers (SMPTE) has proposed a standard SMPTE 312M defining such splicing points entitled "Splice Points for MPEG-2 Transport Streams," which is incorporated herein by reference in its entirety.

Unfortunately, the placement of such In points and out-points is defined by factors such as image frame encoding mode, group of pictures (GOP) structure and the like. Therefore, an end user trying to seamlessly splice between information streams cannot do so in a "frame accurate" manner if the desired splicing points are not appropriate in-points or out-points.

Therefore, it is seen to be desirable to provide a method and apparatus that allows seamless, frame accurate splicing of MPEG-like transport streams. Moreover, it is seen to be desirable to provide a method and apparatus for applying such a seamless, frame accurate splicing method and apparatus to the particular environment of a television studio or other video serving environment.

SUMMARY OF THE INVENTION

The invention comprises a method and apparatus for generating universal splice point adapters, where during a splicing operation an "out-point splicing adapter" is used to transition from an exit stream, while an "in-point splicing adapter" is used to transition to an entry stream.

An out-point splicing adapter comprises an initial portion of a transition stream that terminates in a particular out-point condition. An in-point adapter comprises a remaining portion of the transition that begins with a corresponding particular in-point condition. The terminating condition of the out-point adapter and the initial condition of the in-point adapter are compatible such that any in-point adapter may be concatenated to any corresponding out-point adapter to effect a splice.

Specifically, a method according to the invention for generating a splice point adapter comprises the steps of: identifying at least one out-frame within a transport stream, said out-frame representing a last frame of said transport stream to be included in a spliced transport stream; decoding, for each identified out-frame, a respective portion of said transport stream including said out-frame; and re-encoding each decoded portion of said transport stream to produce a respective out-point adapter, each of said out-point adapters including a terminating predefined out-point condition.

BRIEF DESCRIPTION OF THE DRAWINGS

The teachings of the present invention can be readily understood by considering the following detailed description in conjunction with the accompanying drawings, in which:

FIGS. 5 and 6 depict tabular representations of image frame display order and image frame transmission orders useful in understanding the invention;

FIG. 11 depicts a tabular representation of a meta file suitable for use in the play to air server of FIG. 3.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in any information processing system in which a need exists to perform seamless, frame accurate splicing of, e.g., MPEG-like transport streams including video sub-streams.

An embodiment of the invention will be described within the context of a television studio environment where a play to air controller causes stored video streams (e.g., video segments or "clips") to be retrieved from a server and spliced together in a seamless, frame accurate manner to produce, e.g., an MPEG-2 compliant video stream suitable for transporting to a far end decoder. However, since the scope and teachings of the invention have much broader applicability, the invention should not be construed as being limited to the disclosed embodiments. For example, the invention has applicability to server-based asset streaming for cable headends, insertion of local commercials and trailers for digital cinema, frame accurate Internet-based streaming of MPEG-2 transport streams and limited production facilities (i.e., those production facilities performing only the composition of segments for news or other applications).

Throughout this description various terms are used to describe the invention. Unless modified by the following description, the several of the terms are defined as follows: A spliced stream comprises a stream formed by concatenating an exit-stream (or from-stream) to an entry-stream (or to-stream) at a particular splicing point. An exit-frame is the last frame of an exit-stream. An entry frame is the first frame of an entry-stream.

Figure 1:
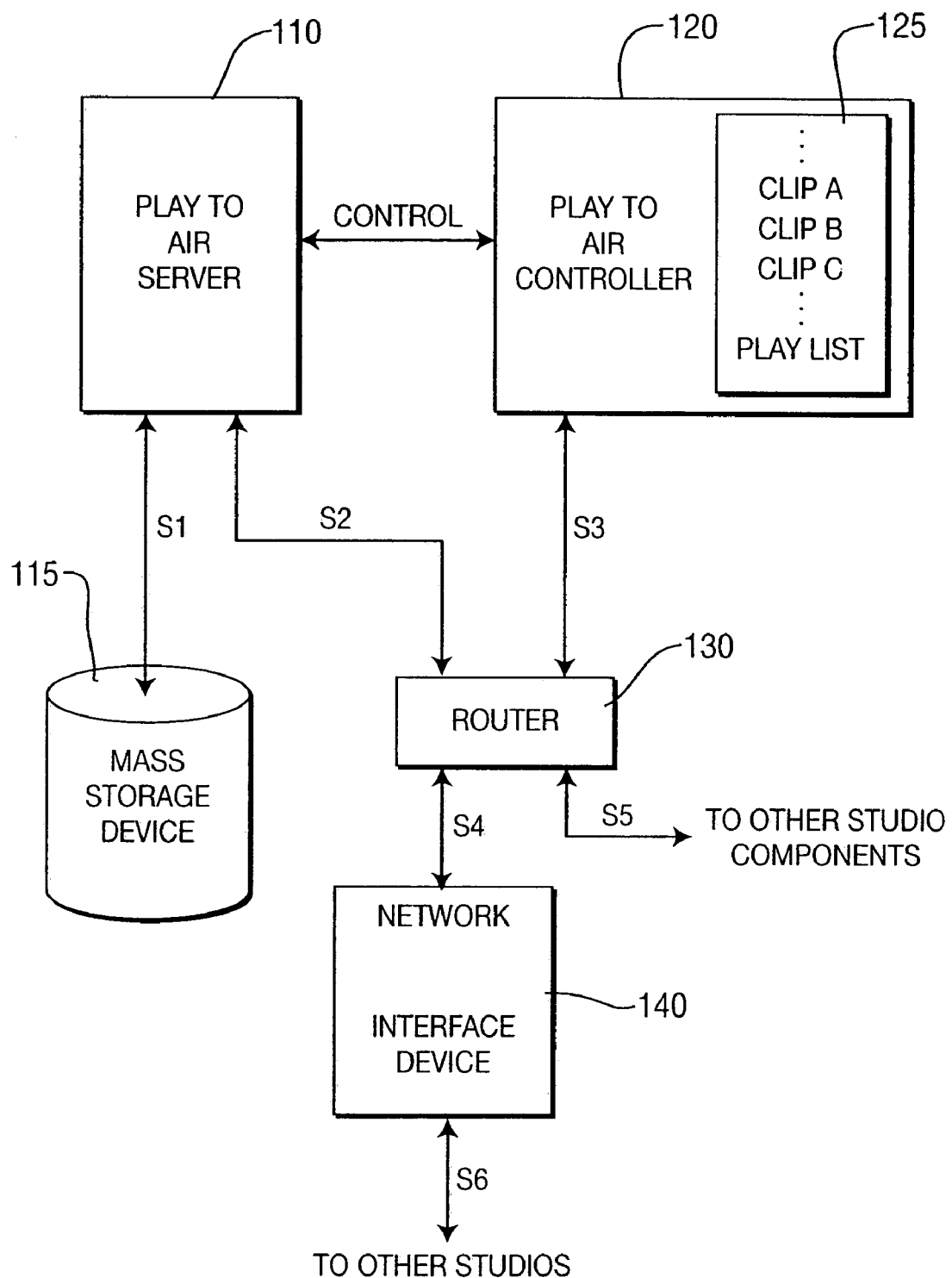
FIG. 1 depicts a high level block diagram of a television studio.

FIG. 1 depicts a high level block diagram of a television studio. Specifically, the studio of FIG. 1 comprises a play to air server 110, a mass storage device 115, a play to air controller 120, a router 130 and a network interface device (NID) 140.

The mass storage device 115 is used to store a plurality of, illustratively, MPEG-2 transport streams including encoded video sub-streams and associated audio streams providing a program. The mass storage device 115 may also be used other types of information streams, such as packetized or non-packetized elementary streams comprising video data, audio data, program information and other data.

The play to air server 110 retrieves, via signal path S1, information streams from the mass storage device 115. The retrieved information streams are processed, in response to a control signal produced by the play to air controller 120 (e.g., a play list) to produce an output transport stream comprising a plurality of concatenated transport streams. The play to air server 110 provides the output transport stream and is coupled to the router 130 via signal path S2.

The play to air controller 120 provides control information to the play to air server 110 and other studio equipment (not shown) via a signal path S3, which is coupled to the router 130. The router 130 is used to route all control and program information between the various functional elements of the television studio 100. For example, control information is passed from the play to air controller 120 via signal path S3 to the router 130, which then passes the control information to the play to air server 110 via signal path S2. Optionally, a direct control connection CONTOL between the play to air controller 120 and the play to air server 110 is used for passing control information.

The router 130 receives the output transport stream from the play to air server 110 via signal path S2 and responsively passes output transport stream to other studio components (e.g., editors, off-line storage elements and the like) via signal path S5, or to the network interface device 140 via signal path S6.

The network interface device (NID) 140 is used to communicate the output transport stream, control information or any other information between the television studio 100 of FIG. 1 and other studios (not shown). Optionally, the NID receives information streams from other studios, remote camera crews, broadcasters and the like. These streams are coupled to the play to air server 110 for immediate processing into an output transport stream being produced (e.g., "live" coverage of a news event), for delayed processing or for storage in the mass storage device (with or without processing).

The play to air server 110 and mass storage device 115 may be implemented using a compressed bitstream video server such as the Origin 2000 "Play-To-Air/Production Server" manufactured by SGI of Mountain View, Calif.

The play to air controller 120 comprises a play list 125 corresponding to the information streams or clips that are to be scheduled for subsequent incorporation into the output transport stream of the play to air server 110. The play list 125 includes exact frame entry and exit locations of each of the information streams or clips that are to be retrieved from the mass storage device 115 and concatenated or spliced into the output transport stream by the play to air server. The play list 125 may also identify the first and last frames for each of the information streams or clips.

The play to air server 110, in response to a control signal from the play to air controller providing at least portions of the play list 125, retrieves the appropriate streams or clips from the mass storage device and splices the clips in a seamless, frame accurate manner according to the frame entry and exit information within the control signal to produce the output transport stream. Importantly, the output transport stream produced has no syntax errors or discontinuities to any other studio component, including any remote feeds provided by the Network Interface Devices 140. The splicing or concatenation operations performed by the play to air server will be explained in more detail below with respect to FIG. 2A and FIG. 2B.

Figures 2A, 2B:
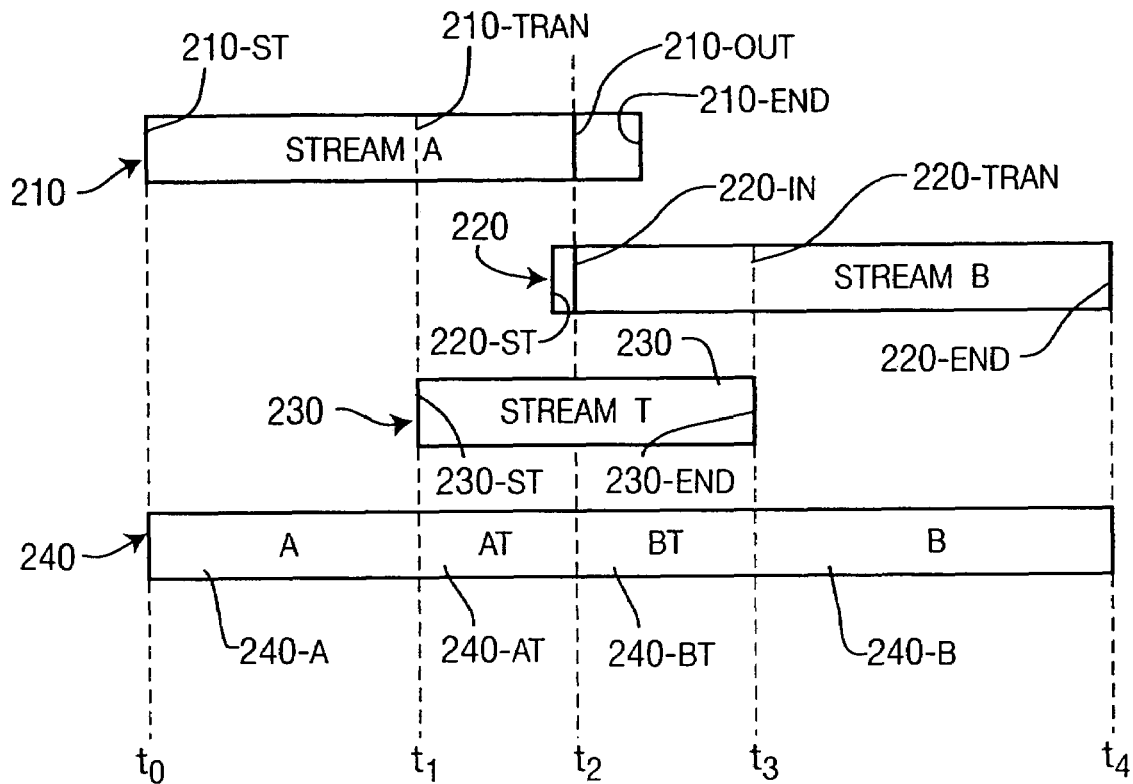
FIG. 2A and FIG. 2B are graphical representations of a splicing operation useful in understanding the invention.

FIG. 2A and FIG. 2B are graphical representations of a splicing operation useful in understanding the invention. Specifically, FIG. 2A graphically depicts a frame accurate, seamless splicing operation of two 30 frames per second MPEG-2 transport stream clips (210, 220) using a transition clip (230) to produce a resulting spliced 30 frames per second MPEG-2 transport stream clip (240). The transition stream 230 is formed using portions of the first stream 210 and the second stream 220. The resulting spliced stream 240 comprises the concatenation of portions of the first 210, transition 230 and second 220 streams. The resulting spliced stream 240 comprises a "knife edge" or frame accurate splice between the first and second streams at an out-point (210-OUT) of the first stream 210 and an in-point (220-IN) of the second stream 220.

FIG. 2B depicts various SMPTE timecodes associated with the streams or clips depicted in FIG. 2A. The first stream or clip 210 (STREAM A) comprises a plurality of frames including a first frame 210-ST beginning at a time $t_0$, illustratively at a respective SMPTE timecode of 00:00:00:00; a transition out frame 210-TRANS beginning at time $t_1$, an out-frame 210-OUT ending at a time $t_2$, illustratively at a respective SMPTE timecode of 00:00:02:13; and a last frame 210-END starting at a time greater than time $t_2$.

The out-frame 210-OUT comprises the last frame of the first stream 210 to be displayed (i.e., the frame immediately preceding the desired splice point). The out-frame 210-OUT will be included within the transition stream 230. The transition out frame 210-TRANS comprises the last frame of the first stream 210 to be transmitted. That is, the transition stream 230 will be concatenated to the first stream 210 immediately after the transition out frame 210-TRANS.

The second stream or clip 220 (STREAM B) comprises a plurality of frames including a first frame 220-ST beginning at a respective SMPTE timecode of 00:00:00:00; an in-frame 220-IN beginning at time $t_2$, illustratively at a respective SMPTE timecode of 00:00:00:23; a transition in frame 220-TRANS beginning at time $t_3$ and a last frame 210-END ending at a time $t_4$, illustratively a respective SMPTE timecode of 00:00:04:17.

The in-frame 220-IN comprises the first frame of the second stream 220 to be displayed (i.e., the frame immediately following the desired splice point). The in-frame 220-IN will be included within the transition stream 230. The transition in frame 210-TRANS comprises the first frame of the second stream 220 to be transmitted. That is, the transition in frame 220-TRANS will be the first frame of the second stream 210 concatenated to the transition stream 230.

The transition stream or clip 230 (STREAM T) is a data structure well adapted to providing seamless, frame accurate splicing of video streams. The transition stream or clip 230 (STREAM T) comprises a plurality of frames including a first frame 230-ST beginning at a time $t_1$; and a last frame 230-END ending at time $t_3$. The transition clip is comprises frames from both the first stream 210 and the second stream 220, including the respective in- and out-frames. The beginning and end of the transition clip is depicted in FIG. 2 as, respectively, time $t_1$ and $t_3$. It must be noted that these times and the actual first and last frames of the transition stream will be determined according to methods that will be described below with respect to FIGS. 8 and 9.

The resulting spliced stream 240 comprises a plurality of frames including a first frame 240-ST beginning at time $t_0$, illustratively a respective SMPTE timecode of 00:00:00:00; and a last frame 240-END ending at time $t_4$, illustratively a respective SMPTE timecode of 00:00:04:17. The spliced stream 240 comprises 73 frames from the first clip 210 (i.e., $t_0$ through $t_2$) and 115 frames from the second clip 220 (i.e., $t_2$ through $t_4$).

The splice stream 240 depicted in FIG. 2A comprises the first 210 and second 220 streams concatenated in a manner (using the transition stream 230) to effect a knife edge splice (splice stream 240 timecode 00:00:02:13) where the first stream 210 is apparently exited at the out frame 210-OUT and the second stream 220 is apparently entered at in frame 220-IN. Utilizing the present invention, this splicing operation occurs in a frame accurate manner, regardless of the frame type of the out (exit) and in (entry) frames.

It should be noted that under ideal splicing conditions (discussed in the SMPTE 312M splicing standard) it is possible that no transition clip is required. However, under most conditions, the transition clip will contain multiple frames rather than the "empty frame" transition clip that may be generated under the ideal conditions.

Figure 3:
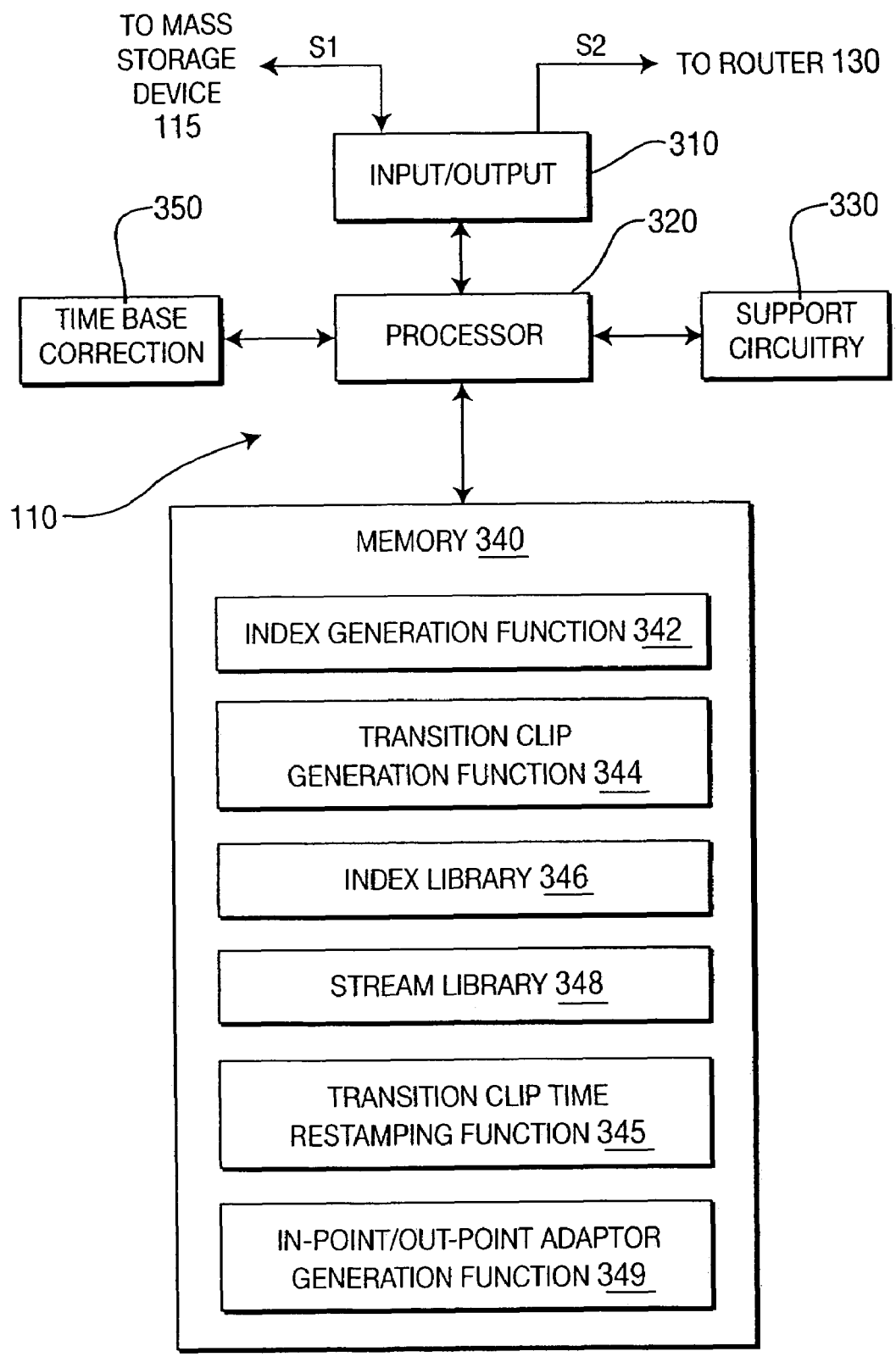
FIG. 3 depicts an embodiment of a play to air server suitable for use in the television studio of FIG. 1.

FIG. 3 depicts an embodiment of a play to air server suitable for use in the television studio of FIG. 1. Specifically, the exemplary play to air server 110 of FIG. 3 comprises an input/output (I/O) circuit 310, support circuitry 330, a processor 320, a memory 340 and an optional time base corrector 350. The processor 320 cooperates with conventional support circuitry 310 such as power supplies, clock circuits, cache memory and the like as well as circuits that assist in executing the various software routines within the play to air server 110. The play to air server 110 also includes input/output circuitry 310 that forms an interface between the play to air server 110 and the mass storage device 115 and router 130.

The memory 340 includes programs and other information suitable for implementing the invention. Specifically, the memory 340 is used to store programs that, when executed by the processor 320, perform an index generation function 342, a transition clip generation function 344 and, optionally, a transition clip time restamping function 345. Optionally, the memory 340 includes one or both of an index library 346 and a stream library 348.

To provide a splicing operation such as described above with respect to FIGS. 2A and 2B, the invention utilizes the transition clip generation function 344. The transition clip generation function 344 generates a transition clip, such that it is possible to exit the first stream 210 at a first prescribed Transport Packet boundary (determined by, e.g., the transition stream generator), run the generated transition clip 230, and then enter the second stream 220 at a second prescribed Transport Packet boundary. The actual exit (210-TRANS) and entry (220-TRANS) points to the first 210 and second 220 stream will typically not correspond to the actual frames that were requested. Rather, the transition clip will be constructed using some number of frames immediately before the splice required exit point 210-OUT of the first stream 210, and some number of frames immediately after the splice required entry point 220-IN of the second stream 220.

The invention selects frames to be included in the transition stream in a manner that, preferably, optimizes the quality of the inter-stream transitions. That is, even though a splicing operation is performed in a frame accurate and seamless manner, it is possible for the splicing operation to result in qualitative degradation of video information near the splicing points. This is caused by "bit starving" or other coding anomalies resulting from, e.g., mismatched video buffering verifier (VBV) levels. The invention adapts the VBV levels to minimize such anomalies.

The index generation function 342 will now be described in detail. Two types of information are used to build a transition clip, frame data and MPEG data. Frame data comprises information such as the location, coding type and presentation order of particular frames in the from- and to-streams. Frame data is used to determine which frames within the from-stream and the to-stream are to be recoded to produce the transition clip. MPEG data comprises information such as frame dimensions, bit rate, frame versus field formats, video buffering verifier (VBV) delay, chrominance sampling formats and the like. MPEG data is used to specify the MPEG encoding characteristics of the transport stream. The transition clip is preferably encoded or recoded using the same MPEG parameters as the input TS.

To assist in the generation of transition clip(s) by the transition clip generation function 344, the invention utilizes the index generation function 342. Specifically, the index generation function 342 is used to processes each of the transport streams to be spliced to determine several parameters associated with each frame within the transport streams. The determined parameters are stored in a meta file, such that each transport stream processed by the index generation function 342 has associated with it a meta file. The transport streams processed by the index generation function 342 may be stored in the mass storage device 115 or in the stream library 348. Similarly, the meta file associated with a transport stream may be stored in the mass storage device 115 or in the index library 346.

In the exemplary embodiment, the index generation function 342 determines, for each respective video frame in a transport encoded video stream, the following:

1) the current picture number (in display order);
2) picture coding type (I-, P- or B-frame);
3) the number of the transport packet containing the start of the frame;
4) the number of the transport packet containing the end of the frame;
5) the presentation time stamp (PTS) of the frame;
6) the decode time stamp (DTS) of the frame;
7) the number of the transport packet containing the start of the sequence header preceding the frame;
8) the number of the transport packet containing the start of the picture header preceding the frame; and
9) any indicia of the frame comprising an appropriate in frame or out frame, such as provided by frame markings according to the SMPTE 312M splicing syntax.

In addition to the per-frame data, the index generation function 342 optionally saves all fields for common MPEG-2 structures such as sequence headers, picture headers and the like.

Thus, the stream library 348 (or mass storage device 115) comprises transport streams that have been processed according to the index generation function 342. An embodiment of the index generation function 342 will be described below with respect to FIG. 10.

Since parsing a transport stream can be time consuming, one embodiment of the invention utilizes pre-indexing. That is, transport streams stored within the mass storage device 115 or stream library 348 are processed by the index generation function 342 at the time of storage or as soon as possible thereafter. In this manner the time required to build transition clips is greatly reduced since there is no need to parse transport streams at the time of splicing to determine frame and MPEG parameters of the streams. In addition, the play to air server 110 optionally utilizes the meta files stored within the mass storage device 115 or index library 346 to quickly retrieve characteristics of a transport stream that may be needed for scheduling and other functions, such as frame rate.

Figure 10:
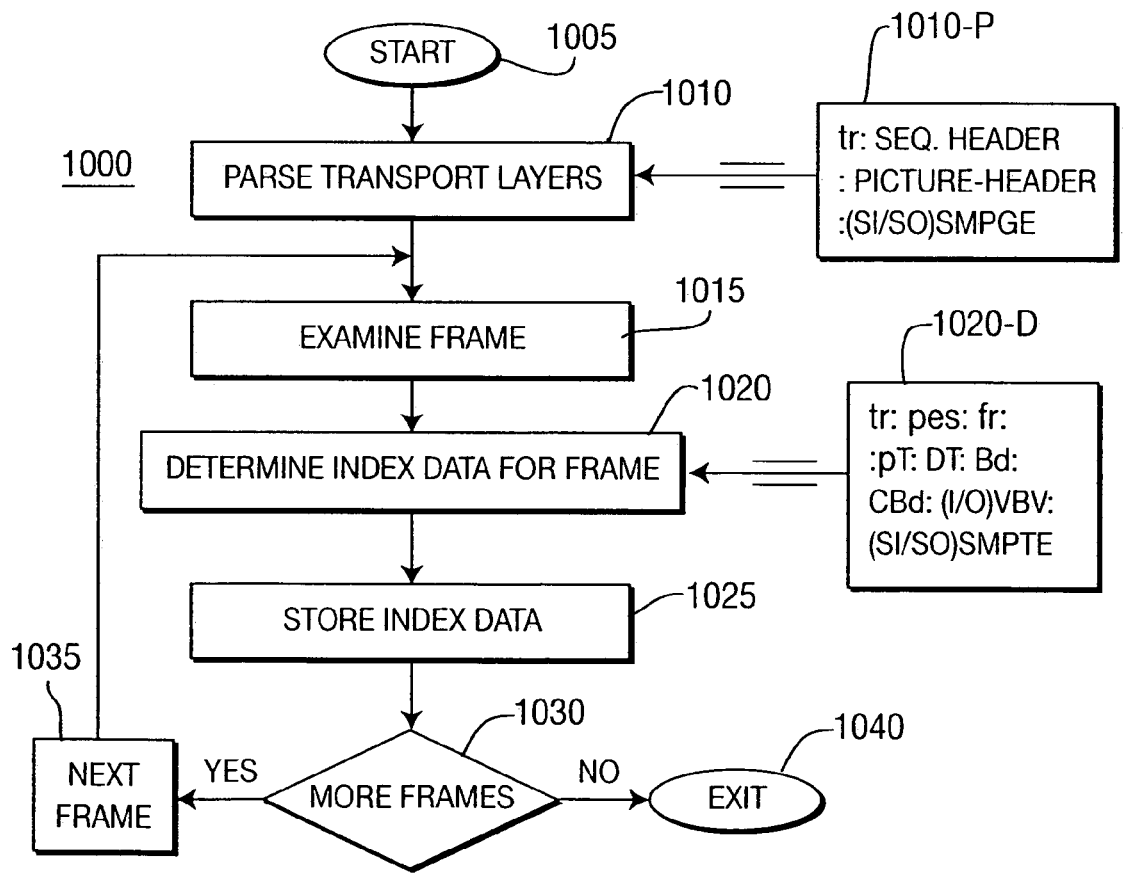
FIG. 10 depicts a flow diagram of a method for indexing an information stream.

FIG. 10 depicts a flow diagram of a method for indexing an information stream. Specifically, FIG. 10 depicts a flow diagram of a method 1000 suitable for use in the index generation function 342 of the play to air server 110 of FIG. 3. The method 1000 of FIG. 10 is suitable for use in implementing step 705 of the method 700 of FIG. 7.

The method 1000 is entered at step 1005, when an information stream to be indexed is received. The method 1000 then proceeds to step 1010.

At step 1010 the transport layer of the information stream to be indexed is parsed. That is, the header portion of each transport packet within the information stream to be parsed is examined to identify a transport packet number (tr), the presence or absence of a sequence header within the transport packet, the presence or absence of a picture header within the transport packet, the presence or absence of a SMPTE 312M splicing syntax indication of a splicing in-frame or a splicing out-frame and other information. The method 1000 then proceeds to step 1015.

At step 1015 the first or present frame is examined. That is, the information stream to be indexed is parsed down to the packetized elementary stream (PES) layer to examine the first video frame of the video elementary stream included within the information stream to be indexed. The method 1000 then proceeds to step 1020.

At step 1020 various parameters associated with the frame examined in step 1015 are determined. Specifically, referring FIG. 1020-D, step 1020 determines the current picture number (in display order), the picture coding type (I-, P- or B-frame), the number of the transport packet containing the start of the frame, the number of the transport packet containing the end of the frame and the presentation times stamp (PTS) and decode time stamp (DTS) of the frame. As previously noted with respect to step 1010, the transport packet containing the start of the sequence header preceding the frame has been noted, the number of the transport packet containing the start of the picture header preceding the frame has been noted and any indicia of the frame comprising an appropriate in-frame or out-frame, such as provided by frame markings according to the SMPTE 312M splicing syntax have been noted. Additionally, at step 1020 the "CBd and Bd" are also determined. The method 1000 then proceeds to step 1025.

The quantity Bd is a buffer delay as marked in the stream. This is the amount of time the first bit of a picture remains in the VBV buffer. The quantity CBd is the calculated buffer delay. The indexer calculates this value as indicated in Annex C of the MPEG-2 specification. The buffer delay Bd and calculated buffer CBd should match, but if the input stream is improperly marked the two quantities may differ. The buffer delay value is used by the invention to determine how to adjust the VBV levels between 210trans and 220trans. The VBV level adjustment is done in the transition clip.

At step 1025 the information regarding the index information is stored in, e.g., the mass storage device 115 or the index library 346. The method 1000 then proceeds to step 1030.

At step 1030 a query is made as to whether more frames are to be processed. If the query is answered negatively, then the method 1000 proceeds to step 1040 where it is exited. If the query is answered affirmatively, then the method 1000 proceeds to step 1035 where the next frame is queued, and to step 1015, where the next queued frame is examined.

FIG. 11 depicts a tabular representation of a meta file suitable for use in the index library 346 of FIG. 3. Specifically, the table 1100 of FIG. 11 comprises a plurality of records (1-54), each record being associated with a respective starting transport packet field 1110, packetized elementary stream identification field 1120, frame and frame type identification field 1130, PTS field 1140, DTS field 1150, $B_d$ field 1160, $CB_d$ 1170 and marked splice point field 1180.

In one embodiment of the invention, the index generation function 342 is not used prior to receiving and/or splicing transport streams. In this embodiment, frame selection is accomplished using a single-pass processing of at least a portion of each transport stream to be spliced to determine several parameters related to the from-stream and to-stream.

For both the from-stream and the to-stream, the following parameters are determined: transport packet offsets of the sequence_header and picture_header to begin decoding, the number of frames to decode; and the number of decoded frames to discard (e.g., anchor frame needed to decode frames to be included in the transition clip).

For the from-stream only, the following parameters are determined: the last transport packet to play from the from-stream (i.e., the new exit point or exit frame); and the PTS of first frame to display in the transition clip.

For the to-stream only, the following parameters are determined: the starting and ending transport packets for the I-frame to copy to the transition clip; the starting and ending transport packets for remaining GOP to copy to the transition clip; the first transport packet to play from the to-stream (i.e., the new entry point or entry frame); and the number of frames to be copied.

In addition, since the indexing library retrieves MPEG fields as it parses a transport stream, all required recoding parameters are also saved during frame selection.

The transition clip generation function 344 will now be described in detail. The process of constructing a transition clip comprises the steps of 1) determining which frames to include in the transition clip; 2) decoding the frame to be included in the transition clip; 3) encoding or recoding the frames forming the transition clip and 4) transport encoding (i.e., packetizing) the transition clip.

Frame selection affects the size of the output transition clip, the amount of time required to generate the transition and places constraints on the encoder in terms of optimizing the quality of the recoded video. The frame selection method discussed herein resolves the issues of frame dependencies while reducing the frame count and still allowing enough transition time to recode the video without significant loss of quality.

The encoding or recoding step is typically the most time consuming step in the transition clip generation function 344, so reducing the number of frames to recode provides time savings. However, since one of the primary reasons for building a transition clip is to reconcile differences in VBV levels between the two transport streams being spliced. Reducing the frame count makes it more difficult for the encoder to maintain video quality while adjusting the VBV level (especially when decreasing it, since frames must be encoded with fewer bits). To decrease the VBV level, fewer bits must be placed into the buffer than are taken out. This requires the encoder to use fewer bits per picture (on average).

FIG. 5 depicts a tabular representation of image frame display order and image frame transmission order useful in understanding the invention. Specifically, FIG. 5 depicts a first tabular representation 510 depicting the display order of, illustratively, 24 encoded image frames forming a portion of a video sequence and a second tabular representation 520 depicting the transmission order of the 24 image frames forming the video sequence. For purposes of this discussion, the video sequence depicted in FIG. 5 comprises a portion of a from-stream video sequence (i.e., the first displayed sequence in a spliced sequence), such as described above with respect to the first stream 210 of FIG. 2.

Specifically, per the first tabular representation 510, the image frames are displayed and encoded according to a group of pictures (GOP) structure as follows (from frame 1 to frame 24):

I-B-B-P-B-B-P-B-B-I-B-B-P-B-B-P-B-B-I-B-B-P-B-B.

Additionally, per the second tabular representation 520, the image frames are transmitted in the following frame order:

1-4-2-3-7-5-6-10-8-9-13-11-12-16-14-15-19-17-18-22-20-21-25-23.

It is assumed, for purposes of the following discussion, that it is desired to exit the video sequence depicted in FIG. 5 at frame 15, which comprises a B-frame. That is, frame 15 comprises the out-frame of the exit stream depicted in FIG. 5. As will be discussed below, frames 10 through 15 will be decoded (in display order). It should be noted that frame 16 is the previous anchor frame to frame 15 in transmission order. Therefore, it is necessary to decode frame 16 prior to decoding frames 14 and 15 (which are B-frames). The last frame in the from-clip prior to the transition clip will be frame 13. That is, the from-clip will be exited immediately before frame 16.

FIG. 6 depicts a tabular representation of image frame display order and image frame transmission order useful in understanding the invention. Specifically, FIG. 6 depicts a first tabular representation 610 depicting the display order of, illustratively, 26 encoded image frames forming a portion of a video sequence and a second tabular representation 620 depicting the transmission order of the 26 image frames forming the video sequence. For purposes of this discussion, the video sequence depicted in FIG. 6 comprises a portion of a to-stream video sequence (i.e., the second displayed sequence in a spliced sequence), such as described above with respect to the second stream 220 of FIG. 2.

Specifically, per the first tabular representation 610, the image frames are displayed and encoded according to a group of pictures (GOP) structure as follows (from frame 1 to frame 26):

I-B-B-P-B-B-P-B-B-I-B-B-P-B-B-P-B-B-I-B-B-P-B-B-I-B.

Additionally, per the second tabular representation 520, the image frames are transmitted in the following frame order:

1-4-2-3-7-5-6-10-8-9-13-11-12-16-14-15-19-17-18-22-20-21-25-23-24-28.

It is assumed, for purposes of the following discussion, that it is desired to enter the video sequence depicted in FIG. 6 at frame 15, which comprises a B-frame. That is, frame 15 comprises the in-frame of the entry stream depicted in FIG. 6. As will be discussed below, frames 10 through 18 will be decoded (in display order). It should be noted that the first frame to be displayed from the to-stream is frame 25 (an I-frame that is not included in the transition clip).

Figure 7:
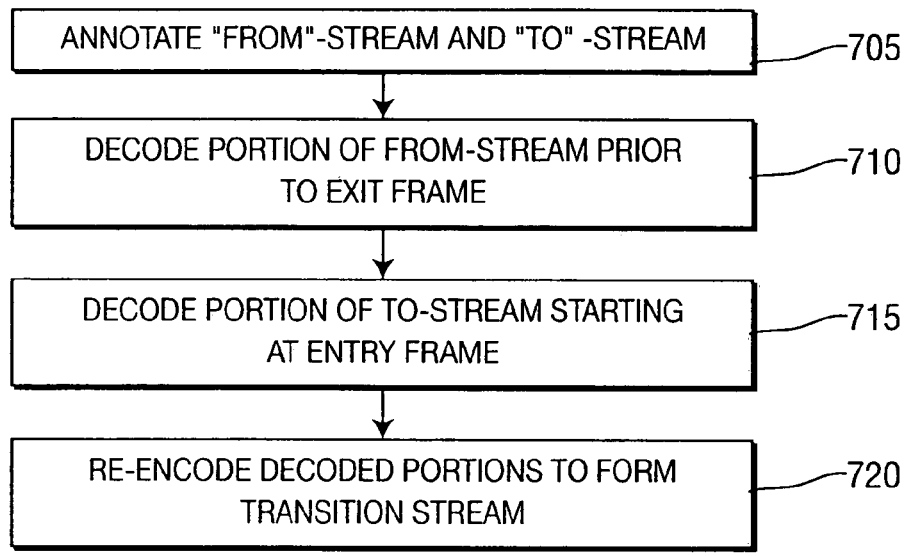
FIG. 7 depicts a flow diagram of a method for generating a transition stream or transition clip.

FIG. 7 depicts a flow diagram of a method for generating a transition stream or transition clip. Specifically, FIG. 7 depicts a flow diagram of a method 700 suitable for use in the transition clip generation function 344 of the play to air server 110 of FIG. 3.

The method 700 is entered at step 705, where a "from-stream" and "to-stream" are annotated. That is, the information stream providing the information prior to a splice point (the from-stream) and the information stream providing information subsequent to the splice point (the to-stream) are annotated to identify, on a frame-by-frame basis various frame parameters as described above with respect to the index generation function 342. A method for annotating an information stream is described above with respect to FIG. 10. The method 700 then proceeds to step 710.

At step 710 a portion of the from-stream prior to the exit frame is decoded. That is, a plurality of information frames within the from-stream, including the exit frame (i.e., the last information frame within the from-stream to be displayed) are decoded. The method 700 then proceeds to step 715.

At step 715 a portion of the to-stream starting at the entry frame is decoded. That is, information frames within the to-stream beginning with the entry frame (i.e., the first frame of the to-stream to be displayed) are decoded. The method 700 then proceeds to 750.

At step 720 the decoded portions of the from-stream and to-stream are re-encoded to produce a transition clip or transition stream. A transport stream including, e.g., video and audio information associated with the from-stream and to-stream.

The transition stream or transition clip generated by the method 700 of FIG. 7 is used as a transition between the from-stream and the to-stream by, e.g., the play to air server 110 of FIGS. 1 and 3.

A. Frame Selection.

The first step in the process of constructing a transition clip or transition stream comprises the step of determining which frames to include in the transition clip (i.e., the frame selection process).

Figure 8:
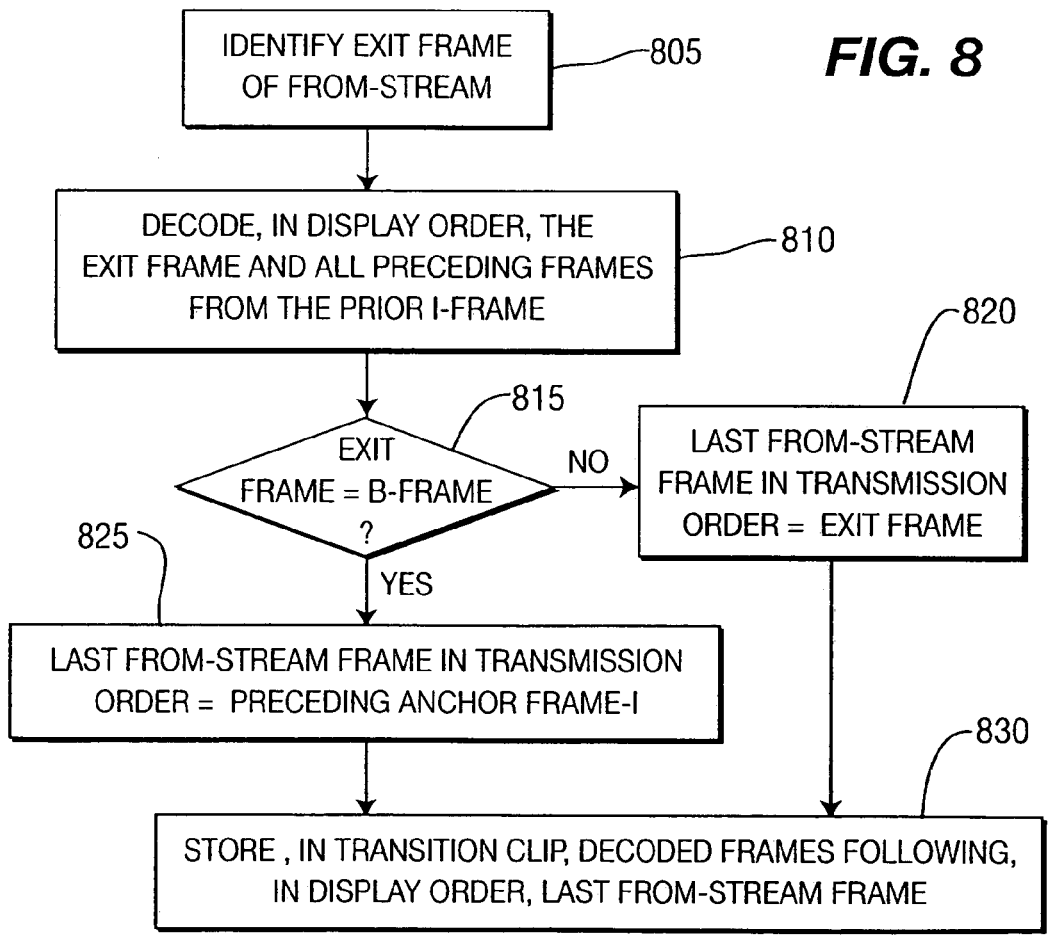
FIG. 8 depicts a flow diagram of a method of determining which information frames within a from-stream should be included within the transition stream.

FIG. 8 depicts a flow diagram of a method of determining which information frames within a from-stream should be included within the transition stream. The method 800 of FIG. 8 is suitable for use in implementing step 710 of the method 700 of FIG. 7.

The method 800 is entered at step 805, where the exit frame of the from-stream is identified. The exit frame of the from-stream is the last frame within the from-stream to be displayed prior to a splice point. For example, referring now to the from-stream depicted in FIG. 5, the exit frame (frame 15) comprises a B-frame denoted as frame 513. The method 800 then proceeds to step 810.

At step 810 the method 800 decodes, in display order, the exit frame and the immediately preceding non-anchor frames. That is, referring again to FIG. 5, the exit frame (frame 15) and the immediately preceding non-anchor frames (frames 11, 12, 13 and 14) are decoded. Since frames 11, 12 and 13 are predicted using frame 10, it is necessary to also decode frame 10. However, the decoded frame 10 may be discarded after frames 11-13 have been decoded. That is, all frames from the I-frame preceding the exit frame in display order up to and including the exit frame are decoded. It is necessary to start from the I-frame because the I-frame has no frame dependencies (i.e., it can be decoded without first decoding any other frames). The method 800 then proceeds to step 815.

At step 815 a query is made as to whether the exit frame is a B-frame. If the query at step 815 is answered negatively, then the method proceeds to step 820. If the query at step 815 is answered affirmatively, then the method 800 proceeds to step 825.

At step 820, since the exit frame is either an I-frame a P-frame, the last from-stream frame to be displayed (i.e., the transition frame) prior to the transition stream frames is the frame immediately preceding, in transmission order, the exit frame. That is, if frame 15 of the from-stream depicted in FIG. 5 was a P-frame or I-frame rather than B-frame, then the last from-stream frame to be displayed would be frame 14. If the exit frame is an I- or P-frame, frame dependencies and reordering make it possible to leave the transport immediately before the next anchor frame (i.e., after all B-frames that are dependent on the exit frame). While this reduces the number of frames to recode, it also reduces the opportunity to adjust VBV levels for the transition. The method 800 then proceeds to step 830.

At step 825 if the exit frame is a B-frame (such as the exit frame in the from-stream depicted in FIG. 5), then the last from-stream frame to be displayed is the frame immediately preceding, in transmission order, the preceding anchor frame. Referring now to FIG. 5, the preceding anchor frame with respect to the exit frame is a P-frame (frame 13). It should be noted that the last frame to be transmitted of the 24 frame sequence depicted in FIG. 5 is the B-frame 12, while the last frame to be displayed is the P-frame 13. The method 800 then proceeds to step 830.

At step 830 the decoded frames following, in display order, the last from-stream frame (e.g., the B-frame denoted as frame 12 in FIG. 5) are stored in the transition clip. It should be noted that the transition stream or clip will also include frames from the to-stream. All of the frames that are stored within the transition clip will then be re-encoded to form an encoded transition clip or transition stream.

Figure 9:
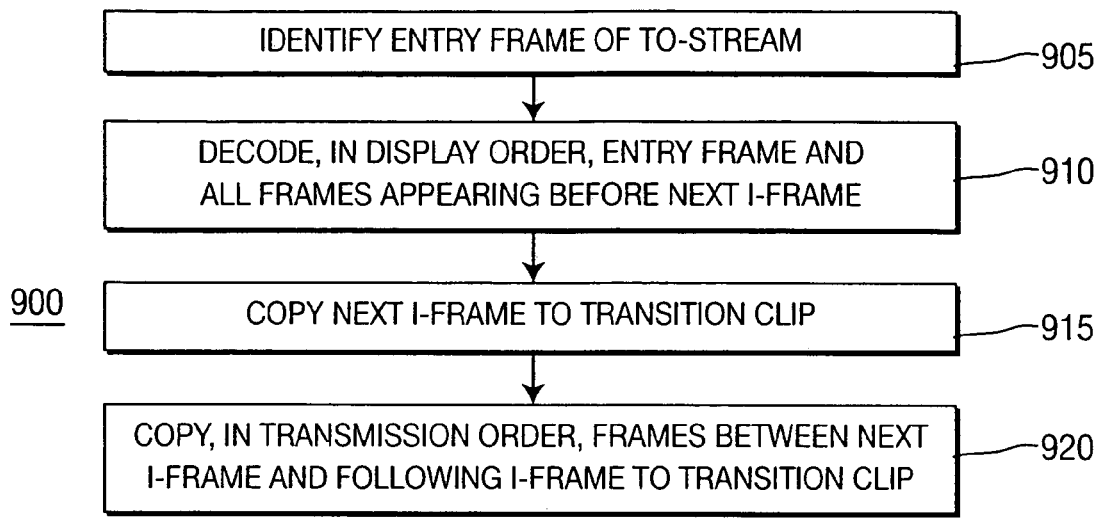
FIG. 9 depicts a flow diagram of a method for determining which information frames within a to-stream should be included within the transition stream.

FIG. 9 depicts a flow diagram of a method for determining which information frames within a to-stream should be included within the transition stream. Specifically, the method 900 of FIG. 9 is suitable for use in implementing step 715 of the transition stream generation method 700 of FIG. 7.

The method 900 is entered at step 905, where the entry frame of the to-stream is identified. The entry frame of the to-stream is the first frame within the to-stream to be displayed after a splice point. For example, referring now to the to-stream depicted in FIG. 6, the entry frame (frame 15) comprises a B-frame. The method 900 then proceeds to step 910.

At step 910 the entry frame and all frames appearing before the next I-frame, in display order, are decoded. That is, referring to FIG. 6, the entry frame (frame 15) and all frames (i.e., frames 16, 17 and 18) appearing before the next I-frame (frame 19) are decoded. Since frames 17 and 18 in the to-stream video sequence depicted in FIG. 6 are predicted using information from the next I-frame (frame 19), it is necessary to also decode the next I-frame. However, the decoded frame 19 may be discarded after frames 17 and 18 have been decoded. The method 900 then proceeds to step 915.

At step 915 the next I-frame (e.g., frame 19 of video sequence 610) is copied to the transition clip. That is, the video information within the transport packets forming the to-stream (i.e., the video elementary stream information) are extracted from the transport packets and copied to the transition clip. It is noted that the output of the encoder is a video elementary stream (VES) such that the output from the encoder may be copied directly to the transition clip. The transition clip will be subsequently packetized. The method 900 then proceeds to step 920.

At step 920 the frames (e.g., frames 20 through 22) between the next I-frame (e.g., frame 25) and the following I-frame (frame 19) are also copied, in transmission order, to the transition clip. It must be noted that the frames copied to the transition clip in steps 915 and 920 (e.g., frames 19-21) are copied to the transition clip as encoded frames. Thus, the method 900 adds to the transition clip decoder frames comprising the entry frame and all frames appearing before the next I-frame, and encoded frames comprising the next I-frame and all frames between the next I-frame and the following I-frame.

The from-stream and to-stream frame selection methods described above with respect to FIGS. 8 and 9 allow for frame dependencies between the transition stream frames and those in one or both of the from-stream and to-stream. The following constraints should be observed. The transition clip is encoded as a closed GOP structure. That is, the transition clip is a self-contained video clip. The transport stream being exited will not reference any frames in the transition clip. If the transport stream being entered is coded using an open GOP structure, then it may contain frames that reference frames in the transition clip.

An important aspect of the invention is the processing of the transition clip to appropriately address frame dependencies of frames that are included within the transition clip. A frame dependency comprises, e.g., a predicted frame within the transition clip (i.e., a P-frame or B-frame) that must be decoded using an anchor frame from outside of the transition clip. While it is desirable to create a transition clip in which there are no external frame dependencies (i.e., a "self contained" clip), the invention is capable of producing an MPEG compliant transition clip including such frame dependencies.

B. Decoding.

The second step in the process of constructing a transition clip or transition stream comprises the step of decoding the frames selected in the frame selection process. The decoding of the selected frames may be effected using standard hardware or software decoding techniques.

It should be noted that, regardless of which frames are to be decoded, decoding must begin at an I-frame. As an artifact of the use of prediction in MPEG encoding, every non-I-frame is ultimately dependent on the previous I-frame. The above-described frame selection methods break these dependencies in order to enable frame accurate, seamless splicing between transport streams.

C. Encoding.

The third step in the process of constructing a transition clip or transition stream comprises the step of encoding the decoded frames resulting from the frame selection and decoding processes. The encoding of the selected frames may be effected using standard hardware or software decoding techniques.

In addition to breaking frame dependencies (as noted above), one of the primary objectives when generating a transition clip is to adjust the VBV levels between the from-stream and to-stream such that a far-end decoder processing the resulting spliced transport stream will not suffer overflow, underflow or other undesirable decoder buffer memory behavior. For example, if the VBV level at the exit point of the from-stream is lower than the VBV level at the entry point of the to-stream, then underflow may result downstream from the splice. In typical decoders this will result in "freeze frames" while the decoder waits for data to become available. A much more serious problem occurs when the VBV level at the exit point of the from-stream is higher than the VBV level of the entry point of the to-stream. This may result in a VBV overflow downstream from the splice. An overflow occurs when more data is available than can be buffered. Overflows result in lost and/or corrupted data and typically cause visual artifacts in the decoded pictures and can even cause a decoder to reset.

After the selected frames have been decoded to baseband, they are recoded into a VES. The inventors used a Sarnoff Corporation DTV/MPEG-2 Software Encoder to ensure high overall performance, picture quality and modularity. The rate control algorithm in the encoder was modified to allow specification of initial and ending VBV levels, while the input module of the encoder was updated to support the output file format of the decoder. The MPEG encoding parameters that were parsed from the transport stream during frame selection are passed to the encoder to ensure that the recoded video is compatible with the clips being spliced.

With respect to rate control (which ultimately determines overall picture quality of the recoded portion of the transition clip), when adjusting the VBV level upwards, the selected frames are coded using fewer bits than the original streams. While increasing the VBV level may result in some loss of quality in the resulting output, due to masking in the human visual system, a small degradation in video quality at a scene change is often imperceptible to a viewer. The inventors have determined that such visual degradation imparted to a stream including a frame accurate, seamless splice does not result in a perceptible level of video degradation.

In one embodiment of the invention, the from-stream and to-stream each comprise transport streams having respective video buffering verifier (VBV). The invention determines if a difference exists between the from-stream VBV and the to-stream VBV and responsively adapts the re-encoding process to such a difference, as necessary. For example, the invention may adapt the re-encoding process by increasing a rate control bit allocation in response to a determination that the from-stream VBV exceeds the to-stream VBV by a first threshold level, and by decreasing the rate control bit allocation in response to a determination that the to-stream VBV exceeds the from-stream VBV by a second threshold level.

D. Packetizing.

The fourth step in the process of constructing a transition clip or transition stream comprises the step of encoding the decoded frames resulting from the frame selection and decoding processes After recoding the selected frames, the I-frame and remaining GOP that were copied from the to-stream are appended to the recoded VES. Pending restamping of temporal_reference fields, the resulting transition clip comprises a syntactically complete MPEG-2 stream (except that is does not have a sequence_end_code) and contains all frames in the transition. The final step is to packetize the VES into a transport stream.

The first step in packetizing the transition stream is to parse the transition stream to locate the offsets of the start of each frame (either a sequence_header or a picture_header) and the types of frames within the transition stream. Once this data is available, the dependencies between frames are calculated and the frame display order is determined. It should be noted that the temporal_reference fields are unsuitable for this purpose since they are presently invalid due to GOP restructuring. Once the display order has been determined, the temporal_reference fields are re-stamped and the presentation (PTS) and decode (DTS) time stamps are calculated for each frame in the transition stream.

It should be noted that according to the MPEG-2 standard, temporal discontinuities within a transport stream are allowed. However, since some decoders are not entirely compliant with the MPEG-2 standard, such allowed temporal discontinuities within a transport stream result in improper decoder operation. Thus, it is desirable to remove such temporal discontinuities within a transport stream by the use of the re-stamping process.

Using the output of the restamping process, PES headers are generated and the frames are output into a PES stream. The location of each PES header and the size of each PES packet are recorded during this process. Finally, transport packets are generated to hold the PES packets. Each layer of packets adds overhead to the TS resulting in a slight size increase. The packets in the resulting TS are stamped with the PID of the video stream being spliced. The final output of the packetizing process is a TS containing a single VES. The stream does not contain any program specific information (PSI).

E. Remultiplexing.

The final step in the process of constructing a transition clip or transition stream comprises the step of remultiplexing the video clip (now a transport stream) with program specific information (PSI) from the original program stream.

To accomplish the remultiplexing step, the from-stream is examined to extract (as transport packets) a single instance of the program association table (PAT) and the program map table (PMT). In the case of splicing single program transport streams there will only be one PMT. In the case of splicing multiple program transport streams there will only be multiple PMTs. Optionally, to fully implement the ATSC broadcast format, it is necessary to extract other tables as well (as known to those skilled in the art).

After extracting the PAT and the PMT(s), the number of packets in the transition clip is calculated based on the multiplex bit rate, the number of frames in the transition clip and the frame rate. For example, the ATSC specification requires a PAT at least every 100 ms and a PMT at least every 400 ms. The number of packets between PAT and PMT tables is determined from the multiplex bit rate.

After calculating the number of packets in the transition clip, a blank transition clip composed of null transport packets is created and the PAT and PMT tables are inserted at the calculated spacings (e.g., PAT every 100 mS and PMT every 400 mS).

After appropriately inserting the PAT and PMT(s) in the blank transition stream, the video transport stream is inserted into the blank transition stream by spacing packets within the remaining available packets, thereby forming an output transport stream.

It should be noted that when inserting the PAT, PMT and video packets into the empty transition clip, each packet should be restamped with a new continuity_counter. The starting value of the continuity_counter is determined separately for each PID from the exit-stream or from-stream. If the video clip is too large, then there won't be enough transport packets in the transition clip, since the size of the transition clip is calculated with respect to the expected clip duration. This calculation takes into account the frame count, frame rate, VBV delays, multiplex bit rate etc. It is important that VBV adjustment is performed properly by the encoder.

The completed transition clip is then inserted between the spliced transport streams at the calculated transport packet offsets, thereby executing a seamless splice.

The above-described invention advantageously provides for seamless, frame accurate splicing or concatenation of transport streams using transition streams of clips, thereby avoiding the construction of an entirely new transport stream. The from- and to-streams are not modified during the process, since they are only used to provide information sufficient to produce the transition stream. The transition stream, after being used to effect a change between streams, may be discarded by the system or saved for future use.

In applications that require the storage of transition clips for every possible splicing combination, the above-described invention requires the generation of a very large number of transition clips. For example, if a server utilizes N streams, 2*N*(N−1) transition clips must be generated. Additionally, it is sometimes impracticable to generate a transition clip due to time and/or processing resource constraints. For example, if the generation of a transition clip requires 8-10 seconds, and a splice into a live, non-delayed video feed is required, then a transition clip may not provide optimal results.

Therefore, in one embodiment of the invention a single transition clip is not used to effect a splice. Rather, an out-point adapter is used to transition out of the exit stream, while an in-point adapter is used to transition into the entry stream. Specifically, this embodiment of the invention utilizes universal "bitstream splicing adapters." In this embodiment of the invention an "out-point splicing adapter" comprises, for example, an initial portion of the above-described transition clip except that out-point splicing adapter ends in a particular condition. Similarly, an "in-point adapter" comprises, for example, a remaining portion of the above-described transition clip except that the in-point splicing adapter begins with a corresponding particular condition. It is important to note that the corresponding terminating out-point adapter conditions and initial in-point and conditions are not dependant upon the stream for which the adapter was initially created. Thus, the terminating condition of the out-point adapter and the initial condition of the in-point adapter are compatible such that any in-point adapter may be concatenated to any corresponding out-point adapter to effect a splice.

The splice point adapters are created for one given stream, not two, so that far fewer adapters are required. Thus the number of adapters which must be created to splice between any of N streams is simply 2*N, which increases only linearly with the number of streams. In addition, the use of splice point adapters allows splicing to remote streams which include such adapters, without knowledge of the condition of the remote stream at the desired splice point. That is, streams received from remote servers that make use of standardized splicing adapters may be spliced by a local server utilizing the standardized splicing adapters, thereby avoiding the need to determine the state of the remote stream in order to splice to it.

While the particular standard condition of the splicing adapters is not of particular importance, it is important is that the same condition be utilized for all streams to be spliced in this manner. In the exemplary embodiment, the in-point and out-point conditions utilized are those provided in the SMPTE proposed standard 312M, entitled "Splice Points for MPEG-2 Transport Streams."

In one embodiment of the invention, the splicing adapters are created in addition to the original streams, thereby leaving the original streams untouched. Alternatively, the splicing adapters are created and used to replace corresponding portions of the original streams such that splicing operations may be facilitated in, for example, a real-time television network environment. In either case, to effect a splice, an out point is created by playing a given original stream up to the point where the out point adapter was created to take over. The out point adapter is then played in its entirety. Immediately following the end of the out point adapter, the in point adapter corresponding to the desired new stream is played in its entirety, whereupon the desired new stream begins to play at a point corresponding to the end of the in point adapter. In another embodiment, only the beginning and end of the original streams are replaced with in and out point adapters, so that these modified streams may be spliced one to another directly.

Figure 4:
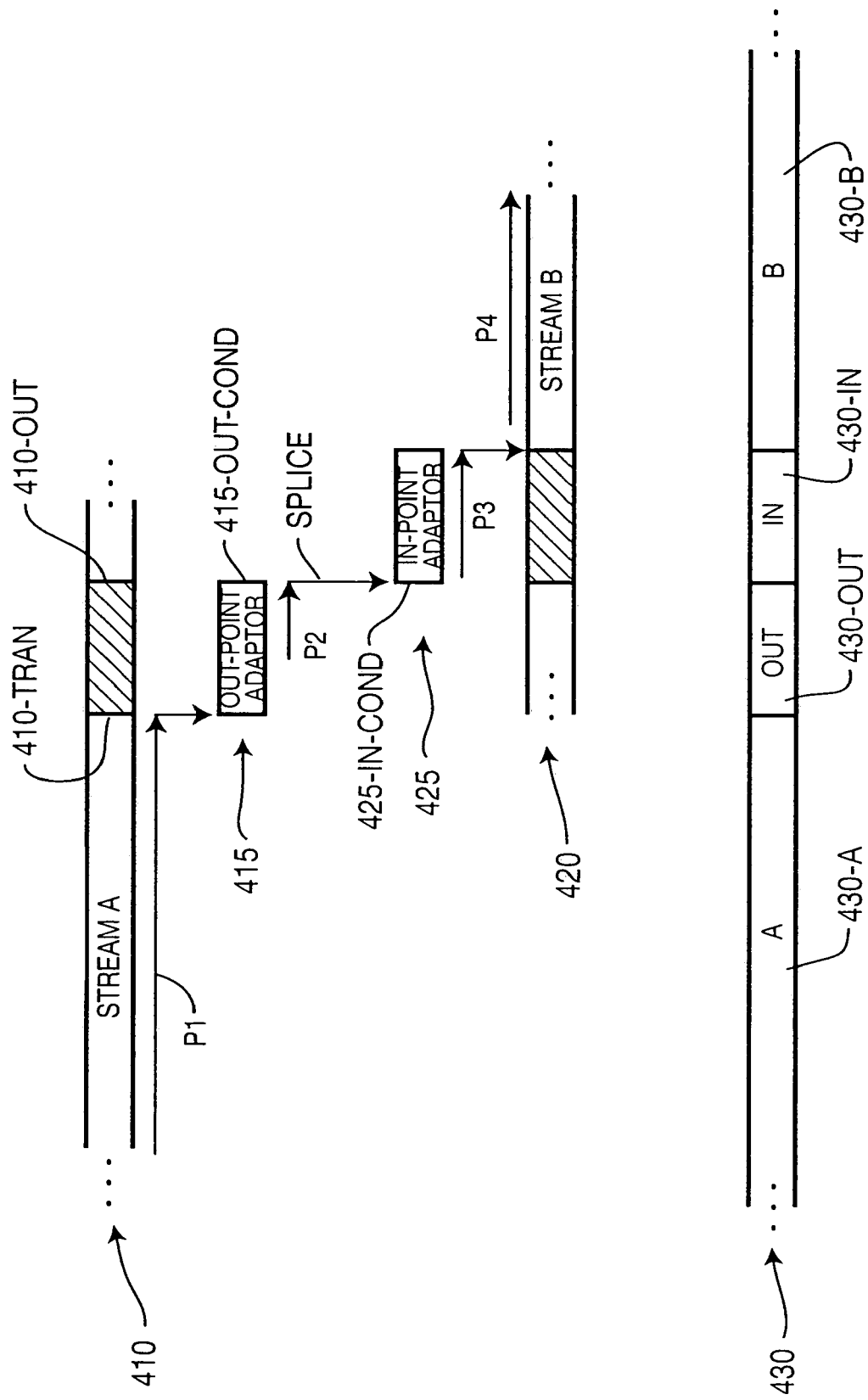
FIG. 4 is a graphical representation of a splicing operating useful in understanding an embodiment of the invention.

FIG. 4 is a graphical representation of a splicing operating useful in understanding an embodiment of the invention. Specifically, FIG. 4 graphically depicts a frame accurate, seamless splicing operation of two MPEG-2 transport stream clips (410, 420) using an out-point adapter (415) and an in-point adapter (425) to produce a resulting spliced stream 430.

Each of the transport stream clips A 410 and B 430 include a shaded region representing respective portions of the streams that are correspond to information utilized in forming the splice adapters. The shaded region of stream A 410 begins with a point 410-TRAN and ends with a point 410-OUT. This region is used to provide the out-point adapter 415, which is terminated with a standard out-point condition 415-OUT-COND. The shaded region of stream B 420 is processed to form the in-point adapter 425.

The resulting spliced stream includes a portion of stream A 430-A prior to the frames utilized in providing the out-point adapter 415, followed by an out-point adapter portion 430-OUT, an in-point adapter portion 430-IN and the portion of stream B following the frames utilized in forming the in-point adapter 425.

Figure 12:
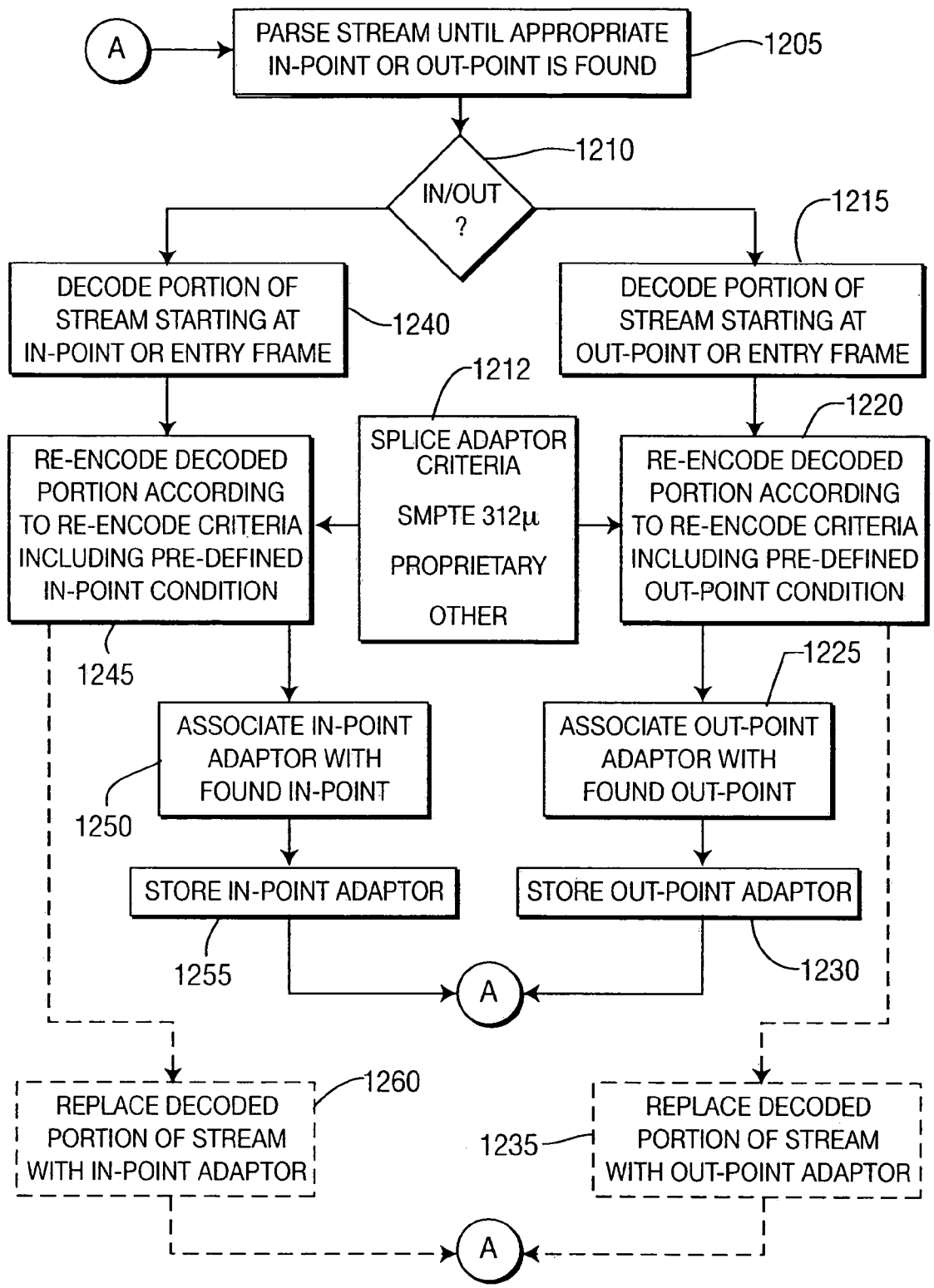
FIG. 12 depicts a flow diagram of a method for generating in-point adapters and out-point adapters.

FIG. 12 depicts a flow diagram of a method for generating in-point adapters and out-point adapters. Specifically, FIG. 12 depicts a flow diagram of a method 1200 suitable for use in the in-point/out-point adapter generation function 349 of the play to air server 110 of FIG. 3.

The method 1200 is entered at step 1205 where a stream to be processed is provided, such as stream A 410 or stream B 420 of FIG. 4. Specifically, at step 1205 the stream to be processed is parsed until an appropriate in-point or out-point is found. For the purposes of this example, it is assumed that a single stream will be processed to provide a plurality of in-point adapters and out-point adapters. It will be recognized that a stream designated as an out-stream may be processed solely to provide out-point adapters, while a stream designated as an in-stream may be processed solely to provide in-point adapters.

At step 1210 a query is made as to whether an in-point or an out-point has been found. If an out-point has been found, then steps 1215 to 1235 are utilized to produce an out-point adapter. If an in-point has been found, then steps 1240 to 1260 are utilized to produce an out-point adapter.

At step 1215 a portion of the stream ending with the out-point or exit frame is decoded. That is, one or more frames including the exit frame or information frame including the out-point within the stream being processed is decoded to provide, for example, a plurality of decoded picture frames or video frames. These frames may be selected in the manner described above with respect to FIG. 8.

At step 1220 the decoded portion of the stream is re-encoded according to re-encode criteria including pre-defined out-point conditions. The re-encode criteria is defined in box 1212. Specifically, per box 1212, the re-encode criteria includes a standard out-point terminating condition according to the SMPTE 312M splice point standard, a proprietary technique or some other standard or technique. The SMPTE 312M parameters, which will be described in more detail below, include the utilization of various flags, buffer levels and other parameters to ensure a seamless or near-seamless splice operation.

At step 1225 the out-point adapter produced at step 1220 is associated with the found out-point. That is, the out-point adapter is associated with the found out-point such that a subsequent splicing operating may utilize the out-point adapter rather than the initial (i.e., unprocessed) portion of the stream being processed, as represented by the shaded region of stream A 410 of FIG. 4.

At step 1230 the out-point adapter is stored in, e.g., mass storage device 115. The method 1200 then proceeds to step 1205 where the next in-point or out-point is found.

Optionally, at step 1235 the out-point adapter produced at step 1220 is used to replace the portion of the stream decoded at step 1215. That is, rather than simply producing an out-point adapter and associated that out-point adapter with a portion of the stream being processed, the optional embodiment of the invention replaces the entire decoded portion associated with that out-point with the out-point adapter produced at step 1220. In this manner, all of the VBV adaptations, frame type adaptations and other adaptations made to the out-point adapter may be incorporated "in line" with the stream being processed such that there is no need for subsequent retrieval of appropriate out-point adapters from memory. The method 1200 then proceeds to step 1205.

At step 1240 the portion of the stream being processed beginning with the in-point or entry frame associated with the found in-point is decoded. That is, at step 1240 the information frame associated with the found in-point and one or more succeeding frames are decoded to produce, for example, a plurality of picture frames or video frames. These frames may be selected in the manner described above with respect to FIG. 9.

At step 1245, the portion of the stream decoded at step 1240 is re-encoded according to re-encode criteria including predefined in-point conditions. As noted with respect to box 1212, the predefined in-point conditions may be in accordance with those defined by SMPTE 312M with proprietary conditions or with other conditions. It is only necessary that the in-point condition, like the out-point condition, be pre-defined or otherwise common throughout a system utilizing the in-point or out-point adapters of the invention.

At step 1250 the in-point adapter produced at step 1245 is associated with the in-point found at step 1205. That is, the in-point adapter is associated with the found in-point such that a subsequent splicing operating may utilize the in-point adapter rather than the initial (i.e., unprocessed) portion of the stream being processed, as represented by the shaded region of stream B 420 of FIG. 4.

At step 1255 the in-point adapter produced at step 1245 is stored in, for example, mass storage device 115. The method then proceeds to step 1205 where the next in-point or out-point is found within the stream being processed.

Optionally, the method 1200 proceeds to step 1260 where the portion of the stream decoded at step 1240 is replaced by the in-point adapter produced at step 1245. In this manner, all of the VBV adaptations, frame type adaptations and other adaptations made to the in-point adapter may be incorporated "in line" with the stream being processed such that there is no need for subsequent retrieval of appropriate in-point adapters from memory. The method 1200 then proceeds to step 1205.

The above-described invention provides for the construction of in-point adapters and out-point adapters that are, respectfully, initiated and terminated according to a common and compatible condition. The exemplary embodiment of the invention utilizes an initial in-point adapter condition, and a corresponding termination out-point condition in accordance with the in-point and out-point constraints described within the SMPTE 312M MPEG-2 splice point standard, which is incorporated herein by reference in its entirety. The in-point constraints and out-point constraints will now be briefly described within the context of an MPEG-2 transport stream. It will be appreciated by those skilled in the art that the invention may be practiced using other in-point and out-point conditions and using other types of information streams. It is only important for the in-point and out-point conditions to be compatible as defined within the context of the invention.

Out-point constraints define the nature of out-points. In-point constraints define the nature of in-points. Out-point constraints are divided into subcategories: out-point constraints that apply to all spliceable PID streams, additional constraints for video PID streams, additional constraints for audio PID streams and constraints which define Program out-points. In-point constraints are divided into subcategories: in-point constraints that apply to all spliceable PID streams, additional constraints for video PID streams, additional constraints for audio PID streams and constraints which define Program in-points. Note that both video and audio PID streams must adhere to the Splice Point constraints for spliceable PID streams.

For all spliceable PID streams, constraints for use in terminating an out-point adapter are defined as follows: The splicing_point_flag shall be set to '1' in the out-point Packet. The splice_countdown shall be set to '0' (0x00) in the out-point Packet. The last byte of the out-point Packet payload shall be the last byte of a PES packet. If the PID of the information stream equals the PCR_PID, then the out-point Packet shall have PCR_flag set to '1' and carry a PCR value. The seamless_splice_flag shall be set to '1' in the out-point Packet. The DTS_next_AU shall be set in the out-point Packet, according to the definition in ISO/IEC 13818-1. The out-point Packet shall carry the splice_type field.

For spliceable video PID streams, additional constraints for use in terminating an out-point adapter are defined. For example, the last picture (in presentation order) preceding an out-point shall be either a P or an I picture. To enable seamless splicing, the last payload byte of the out-point Packet shall remain in the VBV buffer an amount of time equal to: splice_decoding_delay-Display_Period_last_AUold, where Display_Period_last_AUold is the display duration of the video access unit of the old material which begins presentation at the time when the last video access unit is removed from the buffer. To enable seamless splicing, the last picture (in presentation order) before an Out-point shall be either a frame picture or a bottom field picture.

For all spliceable PID streams, constraints for use in initiating an in-point adapter are defined as follows: The splice_point_flag shall be set to '1' in the in-point Packet. The splice_countdown field shall be set to '−1' (0xFF) in the in-point Packet. If the PID equals PCR_PID, the in-point Packet shall have the PCR_flag set to '1' and shall carry a PCR value. That is, the in-point Packet of the PCR_PID must carry both a PCR and PTS/DTS value. Therefore, every in-point Packet of the PCR_PID must have the adaptation_field_control parameter (in the Transport Stream packet header) set to "11". This indicates that the in-point Packet of the PCR_PID has both an adaptation field (for carrying the PCR) and a payload (for carrying the PTS/DTS fields). The payload_unit_start_indicator shall be set to '1' in the in-point Packet. The data_alignment_indicator of the PES packet shall be set to '1'. The random_access_indicator shall be set to '1' in the in-point Packet. The first payload byte of the in-point Packet shall be the first byte of a PES header, which shall carry a PTS. It shall carry DTS if DTS does not equal PTS. The seamless_splice_flag shall be set to '1' in the in-point Packet. DTS_next_AU shall be set in the in-point Packet to the same value as the DTS value carried in the PES header in the in-point Packet. If DTS is not present in the PES header, then DTS_next_AU shall be set to the value of PTS. The in-point Packet shall carry the splice_type field. The splice_type value for video.

For spliceable video PID streams, additional constraints for use in initiating an in-point adapter are defined. For example, the first PES packet payload following an in-point shall begin with a sequence_header. The first coded picture after the sequence_header shall be an I picture. Any B pictures following an in-point shall not use prediction which references pictures prior to the in-point. To enable seamless splicing, the picture_structure of the first picture (in presentation order) after an in-point shall be either Frame picture ('11') or Top Field ('01').

The invention has been primarily described within the context of splicing or concatenating two single program transport streams, i.e., transport streams containing a single audio-visual program, such as a movie, television show or commercial. However, those skilled in the art will appreciate that the invention provides frame accurate, seamless splicing between multi-program transport streams as well. To effect such a splice, the above-described methods are adapted to determine out-frames, in-frames and other appropriate parameters for each program within the multi-program transport streams.

Although various embodiments which incorporate the teachings of the present invention have been shown and described in detail herein, those skilled in the art can readily devise many other varied embodiments that still incorporate these teachings.

What is claimed is:

1. A method for generating a splice point adapter, comprising the steps of:

identifying at least one out-frame within a transport stream, said out-frame representing a last frame of said transport stream to be included in a spliced transport stream;

decoding, for each identified out-frame, a respective portion of said transport stream including said out-frame; and re-encoding each decoded portion of said transport stream to produce a respective out-point adapter, each of said out-point adapters including a predefined terminating out-point condition.

2. The method of claim 1, further comprising the steps of:

identifying at least one in-frame within said transport stream, said in-frame representing a first frame of said transport stream to be included in a spliced transport stream;

decoding, for each identified in-frame, a respective portion of said transport stream including said in-frame; and re-encoding each decoded portion of said transport stream to produce a respective in-point adapter, each of said in-point adapters including an predefined initial in-point condition.

3. The method of claim 2, further comprising the step of:

associating each in-point with a respective in-point adapter, wherein, in the case of a concatenating said transport stream to an additional transport stream at a particular in-point, said decoded portion of said transport stream proximate said particular in-point is replaced by said in-point adapter associated with said particular in-point.

4. The method of claim 2, further comprising the step of indexing each of said transport stream, said step of indexing comprising the steps of:
parsing a transport layer of said transport stream to identify packets associated with at least one of sequence headers, picture headers and predefined splicing syntax; and
determining, for each frame in said transport stream, at least one of a picture number, a picture coding type, a start of frame transport packet number, an end of frame transport packet number, a presentation time stamp (PTS) and a decode time stamp (DTS).

5. The method of claim 4, wherein said determinations for each frame are stored in a meta file for subsequent use in generating a transition stream.

6. The method of claim 1, further comprising the step of:
associating each out-point with a respective out-point adapter, wherein, in the case of a concatenating an additional transport stream to said transport stream at a particular out-point, said decoded portion of said transport stream proximate said particular out-point is replaced by said out-point adapter associated with said particular out-point.

7. The method of claim 1, wherein said decoded portion of said transport stream including said out-frame comprises said out-frame and all preceding frames, in display order, from said out-frame to a prior I-frame;
in the case of said out-frame comprising a B-frame, defining the frame immediately preceding said prior I-frame in transmission order as a final first transport stream frame in said transition stream; and
in the case of said out-frame not comprising a B-frame, defining said out-frame as said final first transport stream frame in said transition stream.

8. The method of claim 1, wherein said portion of transport stream including said in-frame to be decoded is determined according to the steps of:
decoding, in display order, said in-frame and all non-I-frames following said in-frame up to a next I-frame.

9. A method for generating a splice point adapter, comprising the steps of:
identifying at least one in-frame within a transport stream, said in-frame representing a first frame of said transport stream to be included in a spliced transport stream;
decoding, for each identified in-frame, a respective portion of said transport stream including said in-frame; and
re-encoding each decoded portion of said transport stream to produce a respective in-point adapter, each of said in-point adapters including an predefined initial in-point condition.

10. The method of claim 9, further comprising the steps of:
identifying at least one out-frame within said transport stream, said out-frame representing a last frame of said transport stream to be included in a spliced transport stream;
decoding, for each identified out-frame, a respective portion of said transport stream including said out-frame; and
re-encoding each decoded portion of said transport stream to produce a respective out-point adapter, each of said out-point adapters including a predefined terminating out-point condition.

11. The method of claim 10, further comprising the step of:
associating each out-point with a respective out-point adapter, wherein, in the case of a concatenating an additional transport stream to said transport stream at a particular out-point, said decoded portion of said transport stream proximate said particular out-point is replaced by said out-point adapter associated with said particular out-point.

12. The method of claim 10, wherein said decoded portion of said transport stream including said out-frame comprises said out-frame and all preceding frames, in display order, from said out-frame to a prior I-frame;
in the case of said out-frame comprising a B-frame, defining the frame immediately preceding said prior I-frame in transmission order as a final first transport stream frame in said transition stream; and
in the case of said out-frame not comprising a B-frame, defining said out-frame as said final first transport stream frame in said transition stream.

13. The method of claim 9, further comprising the step of:
associating each in-point with a respective in-point adapter, wherein, in the case of a concatenating said transport stream to an additional transport stream at a particular in-point, said decoded portion of said transport stream proximate said particular in-point is replaced by said in-point adapter associated with said particular in-point.

14. The method of claim 9, wherein said portion of transport stream including said in-frame to be decoded is determined according to the steps of:
decoding, in display order, said in-frame and all non-I-frames following said in-frame up to a next I-frame.

15. The method of claim 9, further comprising the step of indexing each of said transport stream, said step of indexing comprising the steps of:
parsing a transport layer of said transport stream to identify packets associated with at least one of sequence headers, picture headers and predefined splicing syntax; and
determining, for each frame in said transport stream, at least one of a picture number, a picture coding type, a start of frame transport packet number, an end of frame transport packet number, a presentation time stamp (PTS) and a decode time stamp (DTS).

16. The method of claim 15, wherein said determinations for each frame are stored in a meta file for subsequent use in generating a transition stream.

17. In a system for processing transport streams, apparatus for generating a splice point adapter comprising:
a controller, for identifying at least one out-frame within a transport stream, said out-frame representing a last frame of said transport stream to be included in a spliced transport stream;
a decoder, responsive to said controller, for decoding each identified out-frame, a respective portion of said transport stream including said out-frame; and
an encoder, for re-encoding each decoded portion of said transport stream to produce a respective out-point adapter, each of said out-point adapters including a predefined terminating out-point condition.

18. The apparatus of claim 17, wherein:
said controller identifies at least one in-frame within said transport stream, said in-frame representing a first frame of said transport stream to be included in a spliced transport stream;
said decoder decodes, for each identified in-frame, a respective portion of said transport stream including said in-frame; and said encoded re-encodes each decoded portion of said transport stream to produce a respective in-point adapter, each of said in-point adapters including an predefined initial in-point condition.

19. The apparatus of claim 18, wherein:
said controller associates each in-point with a respective in-point adapter, wherein, in the case of a concatenating said transport stream to an additional transport stream at a particular in-point, said decoded portion of said transport stream proximate said particular in-point is replaced by said in-point adapter associated with said particular in-point.

20. The apparatus of claim 18, wherein:
said controller parses a transport layer of said transport stream to identify packets associated with at least one of sequence headers, picture headers and predefined splicing syntax; and
said controller determines, for each frame in said transport stream, at least one of a picture number, a picture coding type, a start of frame transport packet number, an end of frame transport packet number, and presentation time stamp (PTS) and a decode time stamp (DTS).

21. The apparatus of claim 20, further comprising:
a memory, for storing within a meta file said controller determinations for each frame in said transport stream, said meta file intended for subsequent use in generating a transition stream.

22. The apparatus of claim 17, wherein:
said controller associates each out-point with a respective out-point adapter, wherein, in the case of a concatenating an additional transport stream to said transport stream at a particular out-point, said decoded portion of said transport stream proximate said particular out-point is replaced by said out-point adapter associated with said particular out-point.

23. The apparatus of claim 17, wherein said decoded portion of said transport stream including said out-frame comprises said out-frame and all preceding frames, in display order, from said out-frame to a prior I-frame;
in the case of said out-frame comprising a B-frame, said controller defines the frame immediately preceding said prior I-frame in transmission order as a final first transport stream frame in said transition stream; and
in the case of said out-frame not comprising a B-frame, said controller defines said out-frame as said final first transport stream frame in said transition stream.

24. The apparatus of claim 17, wherein said controller causes said decoder to decode, in display order, said in-frame and all non-I-frames following said in-frame up to a next I-frame to provide said portion of transport stream including said in-frame to be decoded.

* * * * *